(12) United States Patent
Heard

(10) Patent No.: US 9,610,882 B1
(45) Date of Patent: Apr. 4, 2017

(54) VEHICLE WHEELCHAIR RESTRAINT SYSTEM

(71) Applicant: Darrell Heard, Nashville, TN (US)

(72) Inventor: Darrell Heard, Nashville, TN (US)

( * ) Notice: Subject to any disclaimer, the term of this patent is extended or adjusted under 35 U.S.C. 154(b) by 0 days.

(21) Appl. No.: 14/799,228

(22) Filed: Jul. 14, 2015

(51) Int. Cl.
*B60P 3/07* (2006.01)
*B60P 3/079* (2006.01)
*B60P 7/08* (2006.01)

(52) U.S. Cl.
CPC ............. *B60P 3/079* (2013.01); *B60P 7/0853* (2013.01)

(58) Field of Classification Search
CPC ...... A61G 3/0808; A61G 5/10; B61D 45/001; B61D 45/004; B61D 45/007; B60P 3/079; B60P 3/075; B60P 7/0823; B60P 7/083; B60P 3/077; B60P 7/0807
USPC ........ 410/7, 105, 106, 3, 4, 51, 8; 296/65.04
See application file for complete search history.

(56) References Cited

U.S. PATENT DOCUMENTS

| | | | |
|---|---|---|---|
| 4,177,807 A | 12/1979 | Ocel et al. | |
| 4,688,843 A * | 8/1987 | Hall | A61G 3/0808 248/503.1 |
| 4,826,193 A | 5/1989 | Davis | |
| 5,026,225 A * | 6/1991 | McIntyre | B60R 22/00 280/304.1 |
| 5,567,095 A | 10/1996 | James et al. | |
| 5,888,038 A * | 3/1999 | Ditch | A61G 3/0808 296/65.04 |
| 6,113,325 A * | 9/2000 | Craft | A61G 3/0808 296/65.04 |
| 6,422,794 B1 * | 7/2002 | Zhan | B61D 45/003 410/100 |
| 8,776,323 B2 * | 7/2014 | McLennan | B60P 7/0823 24/170 |
| 2011/0247187 A1* | 10/2011 | Smalley | A01K 13/008 29/401.1 |
| 2013/0205552 A1* | 8/2013 | Nealon | A44B 11/22 24/68 E |

* cited by examiner

*Primary Examiner* — Glenn Dayoan
*Assistant Examiner* — Sunsurraye Westbrook
(74) *Attorney, Agent, or Firm* — Stevenson IP, LLC

(57) ABSTRACT

The vehicle wheelchair restraint system provides a first belt and a second belt with which to anchor both a wheelchair and a wheelchair passenger against movement within a vehicle. In typical use, the first belt is removably hooked to a liner mount or a right angle mount. The first belt is passed through a part of a first side of the wheelchair and across the passenger's lap. The first belt is either wrapped around a part on a second side of the wheelchair and hooked back to itself, or hooked to the wheelchair. The first belt is properly tensioned by a strap ratchet. The second belt is hooked to a mount and to the second side of the wheelchair. The second belt is adjustably tensioned by a belt buckle, with which the second belt first end is hooked to the second end.

3 Claims, 4 Drawing Sheets

VEHICLE WHEELCHAIR RESTRAINT SYSTEM

BACKGROUND OF THE INVENTION

Various types of wheelchair restraints are known in the prior art. However, a number of problems exist with the devices. First is that most vehicles have to be prepared for the restraints. Preparation can be expensive in time and labor, and some require considerable auxiliary equipment in order to work. Removal of seats or even rows of seats is often required. Significantly specialized attachment points are also often necessitated. Many cannot be occupant accessed but instead require an assistant to properly anchor a physically challenged user, even if, as is often the case, many challenged users are capable of significant self reliance. Expense in installation and in use is therein undesirable. Not only do these problems need to be solved, but even user possession of restraints should be encouraged. The present wheelchair vehicle safety system meets and exceeds these current challenges and needs.

FIELD OF THE INVENTION

The present vehicle wheelchair restraint system relates to restraining a wheelchair and wheelchair passenger from movement within a vehicle.

SUMMARY OF THE INVENTION

The general purpose of the vehicle wheelchair restraint system, described subsequently in greater detail, is to provide a vehicle wheelchair restraint system that has many novel features that result in a vehicle wheelchair restraint system which is not anticipated, rendered obvious, suggested, or even implied by prior art, either alone or in combination thereof.

To accomplish this, the vehicle wheelchair restraint system has a first belt having a first segment and a second segment. The first segment has an inner end and an outer end spaced apart from the inner end. The second segment has an origin and a terminus spaced apart from the origin. A plurality of non-swivel strap hooks is provided. A non-swivel strap hook of the plurality of non-swivel snap hooks is affixed to the outer end. One non-swivel strap hook is slidably disposed between the origin and the terminus. Of a pair of hook rings a hook ring is slidably disposed on the first segment. A hook ring is slidably disposed on the second segment. The hook ring on the first segment is affixed to the terminus wherein the second segment is shortened and alternately lengthened by moving the hook ring along the second segment.

A strap ratchet is affixed to the origin and in selective receipt of the inner end. The first segment is wound to and alternately unwound from the strap ratchet in shortening and lengthening the first segment, respectively. A second belt has a first end and a second end spaced apart from the first end. A pair of sleeves is slidably disposed on the second belt wherein the first end passes through one sleeve of the pair of sleeves and the second end passes through one sleeve. A curl is created in the second belt by each sleeve and the second belt. One non-swivel strap hook is disposed in each curl. One hook ring is slidably disposed between the sleeves.

A plurality of equally spaced apart holes is disposed in the first end. A buckle is disposed on the second end. A pair of mounts comprises a right angle mount and a linear mount. A u-hook is disposed atop each of the pair of mounts. A plurality of carriage bolts is disposed within each of the pair of mounts, wherein the carriage bolts are fastened to a vehicle. Each of the first and second belts, are removably fastened to one u-hook of the pair of u-hooks, respectively. Each of the first and second belts, are adjusted to anchor a passenger within a wheelchair and the wheelchair to the vehicle. The carriage bolts are affixed to the plurality of mounts. The carriage bolts are alternately removably inserted into the plurality of mounts.

Thus has been broadly outlined the more important features of the present vehicle wheelchair restraint system so that the detailed description thereof that follows may be better understood and in order that the present contribution to the art may be better appreciated.

BRIEF DESCRIPTION OF THE DRAWINGS

Figures

DETAILED DESCRIPTION OF THE DRAWINGS

Figure 1:
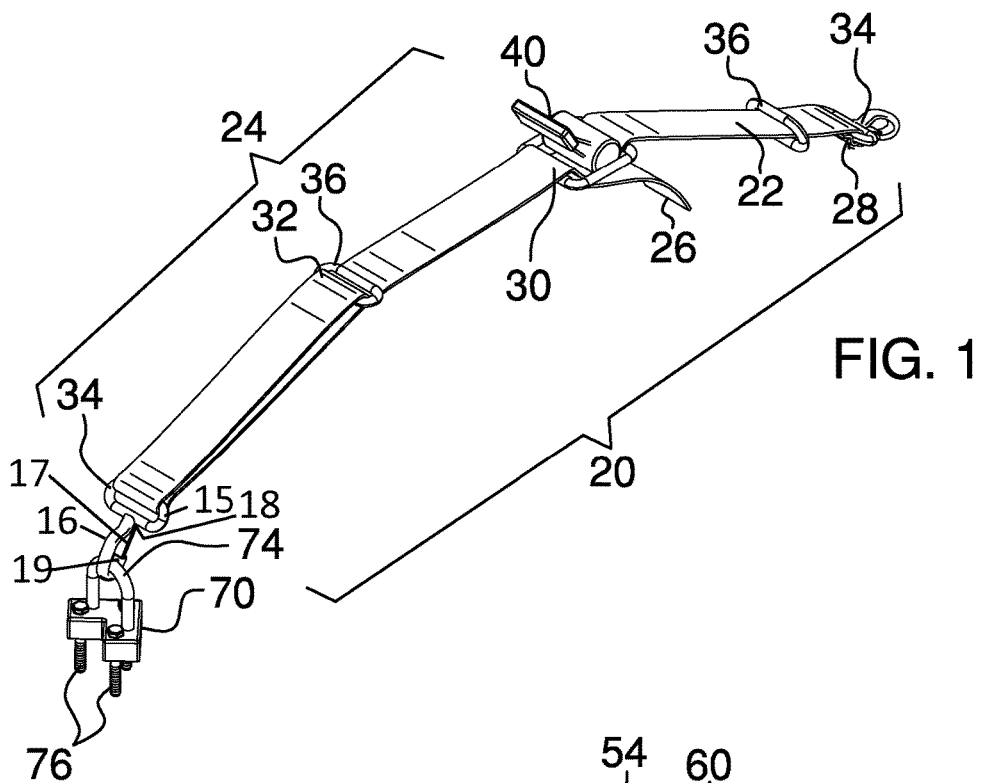
FIG. 1 is a perspective view of a first belt.
Figure 2:
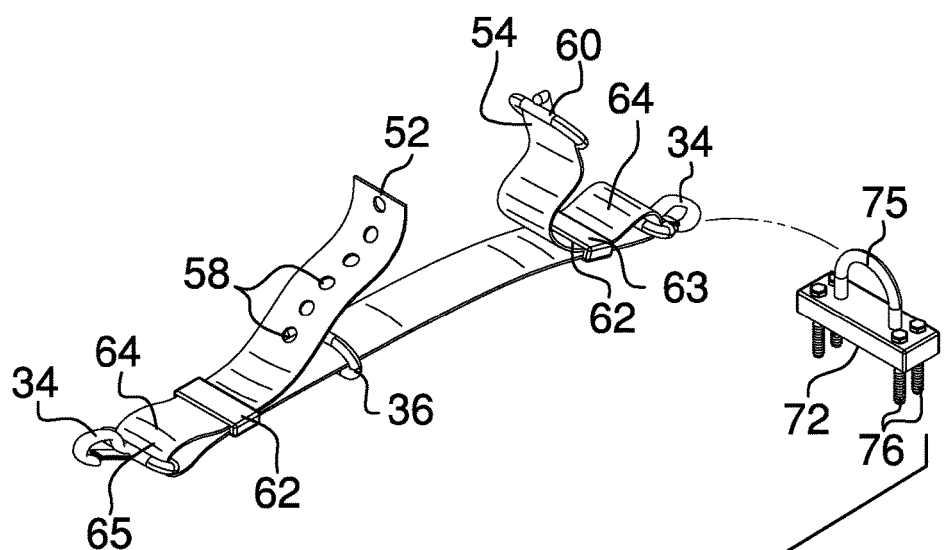
FIG. 2 is a perspective view of a second belt.
Figure 3:
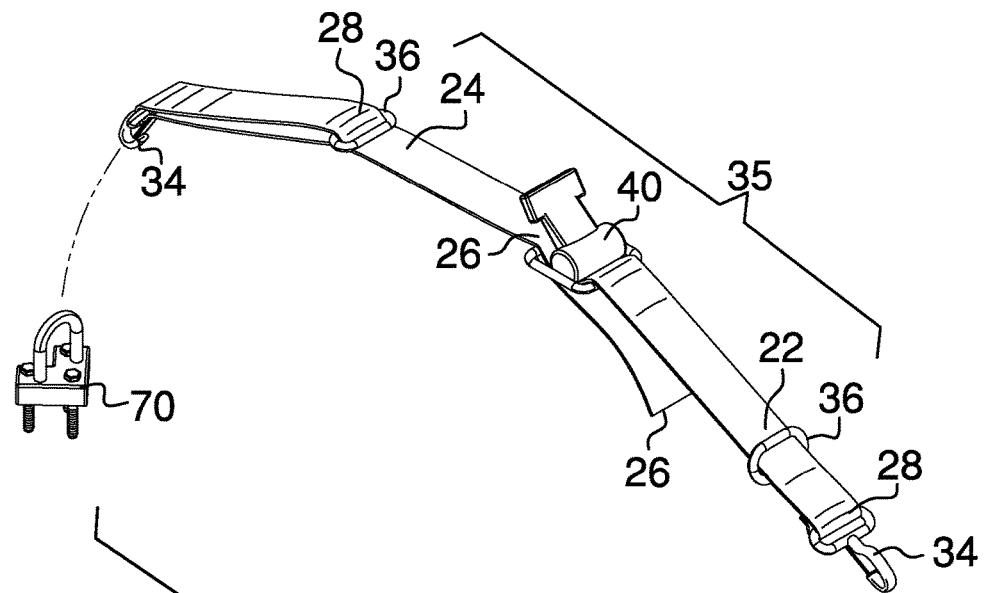
FIG. 3 is a perspective view of the first belt unattached from a right angle mount.
Figure 4:
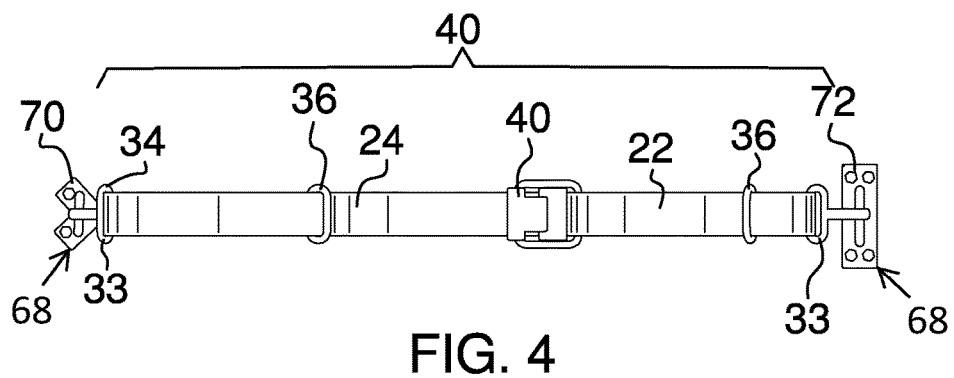
FIG. 4 is a top plan view of the first belt.
Figure 5:
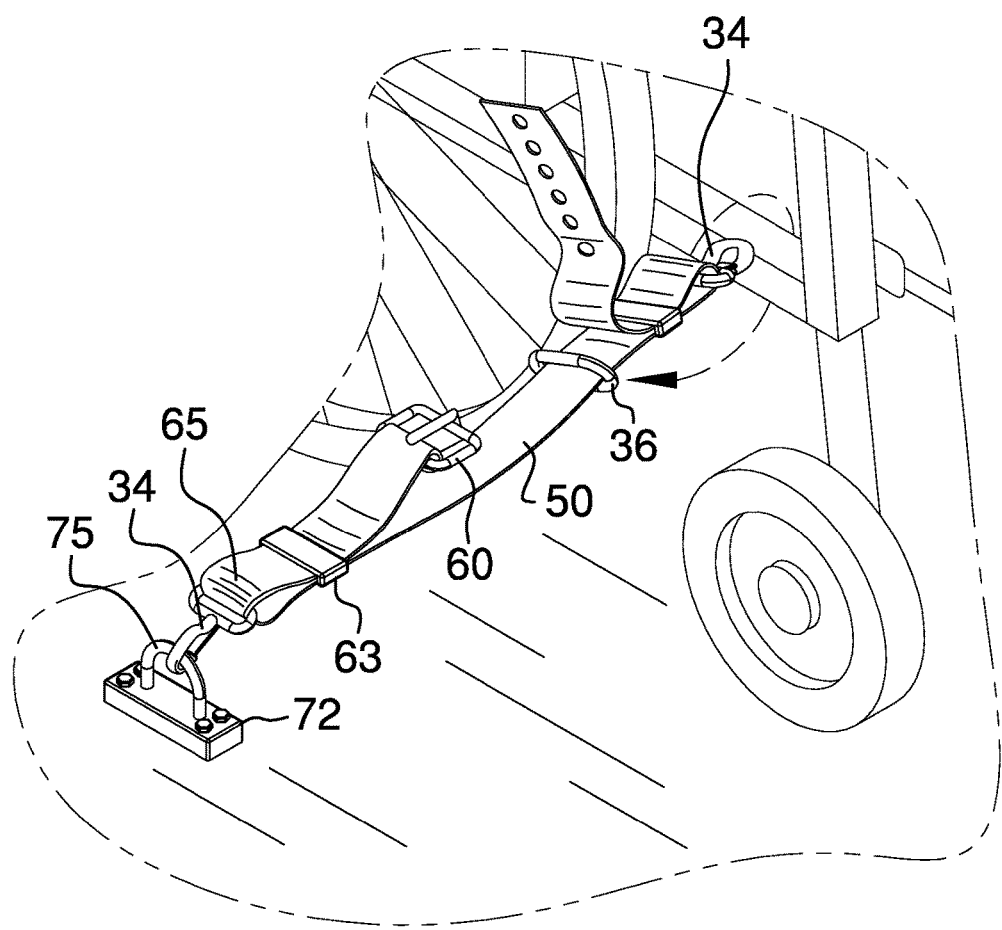
FIG. 5 is an in use view of the second belt.
Figure 6:
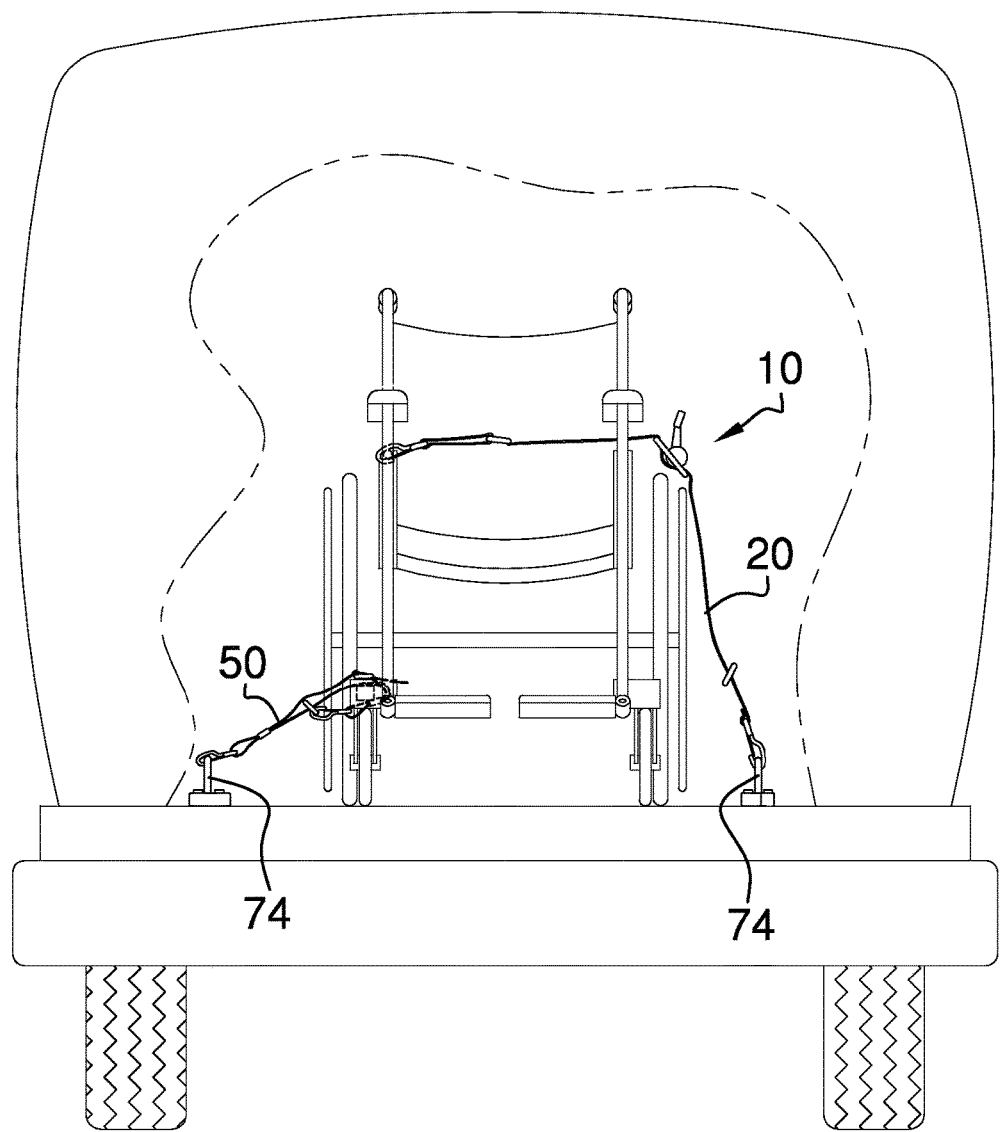
FIG. 6 is an in use view of the first and second belts and a plurality of mounts.

With reference now to the drawings, and in particular FIGS. 1 through 6 thereof, an example of the vehicle wheelchair restraint system employing the principles and concepts of the present vehicle wheelchair restraint system and generally designated by the reference number 10 will be described.

Referring to FIGS. 1 through 6, the vehicle wheelchair restraint system 10 has a first belt 20 having a first segment 22 and a second segment 24. The first segment 22 has an inner end 26 and an outer end 28 spaced apart from the inner end 26. The second segment 24 has an origin 30 and a terminus 32 spaced apart from the origin 30. A plurality of non-swivel strap hooks 33 is provided. Each of the non-swivel strap hooks 33 has an obround ring 15, a hook closure 16 disposed on the obround ring 15, and a closing member 17 pivotably disposed between an affixed end 18 thereof on the obround ring 15 and an exterior end 19 of the hook closure 16. One non-swivel strap hook 34 of the plurality of non-swivel strap hooks 33 is affixed to the outer end 28. One non-swivel strap hook 34 of the plurality of non-swivel straps hooks is slidably disposed between the origin 26 and the terminus 28. A plurality of hook rings 35 is provided. One hook ring 36 of the plurality of hook rings 35 is slidably disposed on the first segment 22. One hook ring 36 of the plurality of hook rings 35 is slidably disposed on the second segment 24. The hook ring 36 of the plurality of hook rings 35 is affixed to the terminus 28 wherein the second segment 24 is shortened and alternately lengthened by moving the hook ring 36 of the plurality of hook rings 35 along the second segment 24.

A plurality of equally spaced apart holes 58 is disposed in the first end 52. A buckle 60 is disposed on the second end 54. A pair of mounts 68 comprises a right angle mount 70 and a linear mount 72. Of a pair of u-hooks 74 one u-hook 75 is disposed atop each of the pair of mounts 72, 74. A plurality of carriage bolts 76 is disposed within each of the pair of mounts 72, 74 wherein the carriage bolts 76 are fastened to a vehicle. Each of the first and second belts 20, 50 are removably fastened to one u-hook 74, respectively. Each of the first and second belts 20, 50 are adjusted to anchor a passenger within a wheelchair and the wheelchair to the vehicle. The carriage bolts 76 are affixed to the plurality of mounts 70, 72. The carriage bolts 76 are alternately removably inserted into the plurality of mounts 70, 72. The carriage bolts fasten the mounts 70, 72 to the vehicle.

What is claimed is:

1. A vehicle wheelchair restraint system comprising:
   a first belt having a first segment and a second segment, the first segment having an inner end and an outer end spaced apart from the inner end, the second segment having an origin and a terminus spaced apart from the origin;
   a plurality of non-swivel strap hooks, one non-swivel strap hook of the plurality of non-swivel strap hooks affixed to the outer end, one non-swivel strap hook of the plurality of non-swivel strap hooks slidably disposed between the origin and the terminus, each of the non-swivel strap hooks having an obround ring, a hook closure disposed on the obround ring, and a closing member pivotably disposed between an affixed end thereof on the obround ring and an exterior end of the hook closure;
   a plurality of hook rings, one hook ring of the plurality of hook rings slidably disposed on the first segment, one hook ring of the plurality of hook rings slidably disposed on the second segment and affixed to the terminus;
   wherein the second segment is shortened and alternately lengthened by moving the hook ring along the second segment;
   a strap ratchet affixed to the origin and in selective receipt of the inner end;
   wherein the first segment is configured to wind and alternately unwind from the strap ratchet;
   a second belt, the second belt having a first end and a second end spaced apart from the first end;
   a pair of sleeves slidably disposed on the second belt wherein the first end is twice passed through one sleeve of the pair of sleeves and the second end is twice passed through another sleeve of the pair of sleeves;
   a pair of curls, one curl of each of the pair of curls created within the second belt with one sleeve of each of the pair of sleeves;
   one non-swivel strap hook of each of the plurality of strap hooks disposed in each curl of each of the pair of curls;
   one hook ring of the plurality of hook rings slidably disposed between the pair of sleeves;
   a plurality of equally spaced apart holes disposed proximal the first end;
   a buckle disposed on the second end;
   a pair of mounts comprising a right angle mount and a linear mount;
   a pair of u-hooks, one u-hook of each of the pair of u-hooks disposed atop each of the right angle mount and the linear mount; and
   a plurality of carriage bolts disposed within each of the right angle mount and the straight mount;
   wherein the carriage bolts are configured to fasten to a vehicle;
   wherein each of the first belt and the second belt is configured to removably fasten to one u-hook of the pair of u-hooks; and
   wherein each of the first belt and the second belt is configured to adjust to anchor a passenger within a wheelchair and the wheelchair to the vehicle.

2. The vehicle wheelchair restraint system of claim 1 wherein the carriage bolts are affixed to the pair of mounts.

3. The vehicle wheelchair restraint system of claim 1 wherein the carriage bolts are removably inserted into the pair of mounts.

* * * * *